US005537819A

United States Patent [19]

Kobayashi

[11] Patent Number: 5,537,819

[45] Date of Patent: Jul. 23, 1996

[54] HYDRAULIC DEVICE FOR WORKING MACHINE

[75] Inventor: Takahiro Kobayashi, Akashi, Japan

[73] Assignee: Kabushiki Kaisha Kobe Seiko Sho, Kobe, Japan

[21] Appl. No.: 397,062

[22] PCT Filed: Jul. 22, 1994

[86] PCT No.: PCT/JP94/01213

§ 371 Date: Mar. 15, 1995

§ 102(e) Date: Mar. 15, 1995

[87] PCT Pub. No.: WO95/04227

PCT Pub. Date: Feb. 9, 1995

[30] Foreign Application Priority Data

Jul. 30, 1993 [JP] Japan .................................... 5-189957

[51] Int. Cl.[6] .................................................... F16D 31/02

[52] U.S. Cl. ................................ 60/459; 60/468; 91/448; 91/459

[58] Field of Search ............................. 60/459, 468, 494, 60/431; 91/444, 448, 459, 446

[56] References Cited

U.S. PATENT DOCUMENTS

| | | | |
|---|---|---|---|
| 4,856,278 | 8/1989 | Widmann et al. | 91/459 X |
| 5,062,350 | 11/1991 | Tanaka et al. | 91/448 |
| 5,129,230 | 7/1992 | Izumi et al. | 60/468 X |
| 5,307,631 | 5/1994 | Tatsumi et al. | 91/459 X |

FOREIGN PATENT DOCUMENTS

| | | |
|---|---|---|
| 79604 | 5/1984 | Japan . |
| 175804 | 9/1985 | Japan . |
| 191504 | 11/1986 | Japan . |
| 186004 | 8/1988 | Japan . |
| 312202 | 12/1989 | Japan . |
| 100198 | 8/1992 | Japan . |

OTHER PUBLICATIONS

U.S. Serial No. 08/301875 Kobayashi Filing Date: Sep./07/1994.

*Primary Examiner*—Hoang Nguyen
*Attorney, Agent, or Firm*—Oblon, Spivak, McClelland, Maier & Neustadt

[57] ABSTRACT

A hydraulic device for operating an actuator in a working machine such as a hydraulic shovel or the like has a solenoid-operated proportional flow regulating valve connected to a pipe between a hydraulic pump and a directional control valve for changing the direction in which the actuator operates, and a discharge pressure control assembly for controlling the discharge pressure from the hydraulic pump to make constant the differential pressure between the inlet and outlet ports of the solenoid-operated proportional flow regulating valve. Flow rate characteristics of oil supplied under pressure to the actuator with respect to the amount of controlling movement of a control lever are established by a flow rate setting unit depending on a load pressure on the actuator and the rotational speed of an engine which operates the hydraulic pump. The opening of the solenoid-operated proportional flow regulating valve is controlled by a solenoid-operated valve control unit depending on the amount of controlling movement of the control lever in accordance with the established flow rate characteristics. It is possible to obtain suitable flow rate characteristics of oil supplied under pressure to the actuator to meet the operator's preference or various working patterns, and the operator can quickly and easily recognize the load condition of the actuator through the operation of the control lever.

4 Claims, 3 Drawing Sheets

HYDRAULIC DEVICE FOR WORKING MACHINE

BACKGROUND OF THE INVENTION

1. Field of the Invention:

The present invention relates to a hydraulic device for use in a working machine such as a hydraulic shovel or the like, and more particularly to a hydraulic device for use in a working machine capable of carrying out building, construction, and civil engineering work with actuators such as hydraulic cylinders and a hydraulic motor which can be operated by the operator with control levers.

2. Description of the Related Art:

Hydraulic shovels have actuators such as hydraulic cylinders for actuating an arm, a boom, and a bucket, and a hydraulic motor for turning some members. These actuators are operated by oil under pressure which is discharged by a hydraulic pump that can be driven by an engine mounted on a motor vehicle. The actuators can operate in different directions which are selected by directional control valves that are controlled by control levers connected to pipes extending from the hydraulic pump to the actuators.

Usually, each of the directional control valves is supplied with a pilot pressure proportional to the amount of controlling movement of the corresponding control lever. The supplied pilot pressure displaces a spool of the directional control valve to equalize the opening area (opening) of the directional control valve to a desired opening area which is in proportion to the amount of controlling movement of the control lever. One generally known type of hydraulic device for use in such a working machine has a pressure compensator for controlling the difference between the pressure at the outlet of the directional control valve, i.e., the load pressure on the actuator, and the pressure at the inlet of the directional control valve so as to be equal to a preset differential pressure, so that the flow rate of oil supplied to the actuator is proportional to the opening area of the directional control valve, i.e., the amount of controlling movement of the control lever, irrespective of the magnitude of the load pressure on the actuator.

The operator of the working machine should preferably have a choice of available flow rate gains for oil supplied to the actuator with respect to the amount of controlling movement of the control lever, i.e., the operator should be capable of selecting a desired one of rates of change of the flow rate with respect to the amount of controlling movement of the control lever. The operator should also be able to quickly recognize the load condition of the actuator through the operation of the control lever.

The conventional hydraulic device with a pressure compensator allows the operator to adjust a setting for the differential pressure between the inlet and outlet of the directional control valve for thereby adjusting the flow rate gain. Since the opening of the directional control valve is proportional to the amount of controlling movement of the control lever, however, the amount of controlling movement of the control lever which starts to supply oil to the actuator to operate the actuator is constant regardless of the magnitude of the load on the actuator. Consequently, the operator cannot recognize the load condition of the actuator through the controlling of the control lever.

It is possible to adjust the flow rate gain when the differential pressure between the inlet and outlet of the directional control valve is automatically set depending on the load pressure on the actuator. The operator can now recognize the load condition of the actuator because the operational speed of the actuator varies depending on the load thereof even if the amount of controlling movement of the control lever remains the same. However, inasmuch as the flow rate gain is determined in advance depending on the load imposed on the actuator, it is not possible to operate the actuator in a manner to meet the operator's preference or various working patterns.

Some hydraulic devices for use with working machines are of the so-called bleed-off control type with no pressure compensator. In this type, the amount of controlling movement of the control lever which starts to operate the actuator varies depending on the load imposed on the actuator. Since the flow rate gain simultaneously .varies depending on the load on the actuator, the flow rate gain cannot be adjusted to meet the operator's preference or various working patterns.

SUMMARY OF THE INVENTION

It is therefore an object of the present invention to provide a hydraulic device for use in a working machine such as a hydraulic shovel or the like, which is capable of achieving flow rate characteristics for an actuator depending on the operation of a control level in a manner to meet the operator's preference or various working patterns, and which allows the operator to recognize the load condition of the actuator quickly and easily through the operation of the control lever.

To achieve the above object, there is provided in accordance with the present invention a hydraulic device for use in a working machine, comprising a hydraulic pump operable by an engine whose rotational speed is adjustable by a speed regulator, an actuator operable by oil supplied under pressure from the hydraulic pump, a directional control valve connected to a pipe between the actuator and the hydraulic pump for changing a direction in which the actuator operates, a control lever for shifting the directional control valve, a solenoid-operated proportional flow regulating valve connected to the pipe for controlling a flow rate of the oil supplied under pressure from the hydraulic pump to the actuator, first pressure detecting means for detecting a load pressure on the actuator on an outlet side of the solenoid-operated proportional flow regulating valve, second pressure detecting means for detecting a pressure on an inlet side of the solenoid-operated proportional flow regulating valve, discharge pressure control means for controlling a discharge pressure of the hydraulic pump to equalize the difference between the pressures detected by the first and second pressure detecting means to a preset differential pressure, controlling movement detecting means for detecting an amount of controlling movement of the control lever, speed detecting means for detecting the rotational speed of the engine, flow rate setting means for establishing flow rate characteristics of the oil supplied under pressure to the actuator with respect to the amount of controlling movement of the control lever, depending on the load pressure on the actuator detected by the first pressure detecting means and the rotational speed of the engine detected by the speed detecting means, and solenoid-operated valve control means for adjusting an opening of the solenoid-operated proportional flow regulating valve to achieve the flow rate Characteristics established by the flow rate setting means depending on the amount of controlling movement of the control lever detected by the controlling movement detecting means.

The difference between the load pressure on the outlet side of the solenoid-operated proportional flow regulating valve and the pressure on the inlet side thereof is maintained at the preset differential pressure by controlling the discharge pressure from the hydraulic pump with the discharge pressure control means. Therefore, the flow rate of the oil supplied under pressure from the solenoid-operated proportional flow regulating valve to the actuator is proportional to the opening of the solenoid-operated proportional flow regulating valve. Desired flow characteristics established by the flow rate setting means can be obtained by controlling the opening of the solenoid-operated proportional flow regulating valve depending on the amount of controlling movement of the control lever with the solenoid-operated valve control means. Since the flow rate characteristics of oil supplied under pressure to the actuator with respect to the amount of controlling movement of the control lever, and a flow rate gain (a rate of change of the flow rate of oil under pressure with respect to the amount of controlling movement of the control lever) can be established as desired, it is possible for the operator to recognize the load condition of the actuator based on the flow rate characteristics as they are recognized through the operation of the control lever, by establishing the flow rate characteristics depending on the load pressure on the actuator. With the flow rate characteristics established depending on the rotational speed of the engine, the operator can select suitable flow rate characteristics to meet his preference or working pattern by adjusting the rotational speed with the speed regulator.

The flow rate setting means may establish flow rate characteristics such that a gain of flow rate of the oil supplied under pressure to the actuator with respect to the amount of controlling movement of the control lever increases as the rotational speed of the engine detected by the speed detecting means increases. This allows the operator to select a flow rate gain corresponding to the rotational speed in a wide gain range by adjusting the rotational speed with the speed regulator, so that the actuator can be operated in a manner to meet the operator's preference and working pattern.

The flow rate setting means may establish flow rate characteristics such that an amount of controlling movement of the control lever at which the oil under pressure starts flowing into the actuator increases as the load pressure on the actuator detected by the first pressure detecting means increases. Based on the amount of controlling movement of the control lever at which the actuator starts to operate, the operator can quickly and easily recognize the magnitude of the load on the actuator, and hence can operate the actuator appropriately depending on the recognized magnitude of the load.

The discharge pressure control means may comprise a solenoid-operated proportional unloading valve connected to a pipe branched from a pipe extending from the hydraulic pump to the solenoid-operated proportional flow regulating valve. The discharge pressure from the hydraulic pump may be controlled by controlling a pressure setting for the solenoid-operated proportional unloading valve to equalize the difference between the pressures detected by the first and second pressure detecting means to the preset differential pressure. The discharge pressure from the hydraulic pump can easily be controlled with a simple arrangement.

The above and other objects, features, and advantages of the present invention will become apparent from the following description when taken in conjunction with the accompanying drawings which illustrate a preferred embodiment of the present invention by way of example.

DETAILED DESCRIPTION OF THE PREFERRED EMBODIMENT

Figure 1:
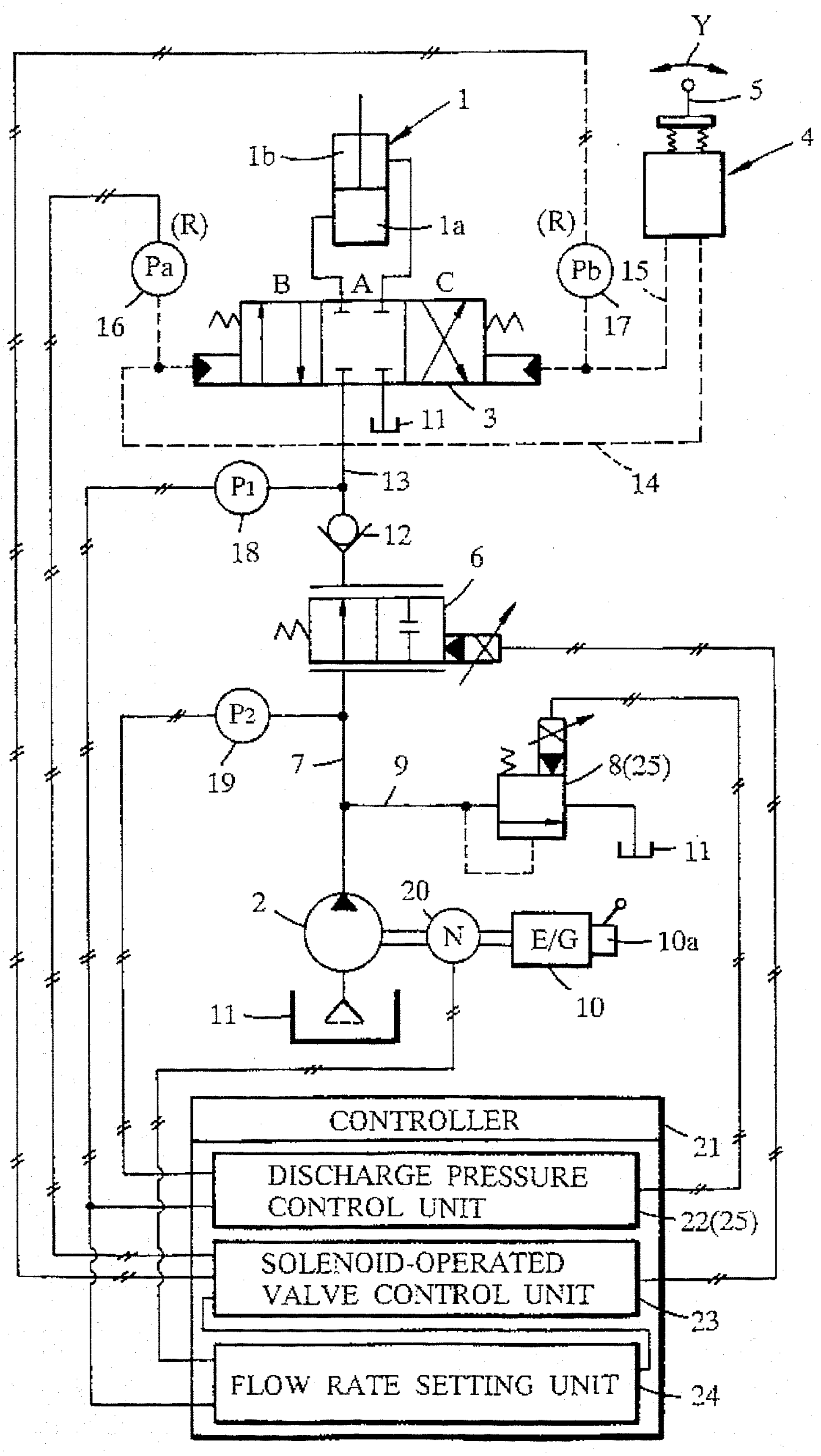
FIG. 1 is a hydraulic circuit diagram, partly in block form, of a hydraulic device for use in a working machine.

As shown in FIG. 1, a hydraulic device for use in a working machine such as a hydraulic shovel or the like according to the present invention includes a hydraulic cylinder (actuator) 1 for operating an arm or the like (not shown) of the working machine, a hydraulic pump 2 for supplying oil under pressure to the hydraulic cylinder 1 to operate the hydraulic cylinder 1, a directional control valve 3 having a pair of cylinder ports connected respectively to bottom- and rod-side oil chambers 1*a*, 1*b* of the hydraulic cylinder 1, a control unit 4 having a control lever 5 which is operable by the operator to cause the directional control valve 3 to operate the hydraulic cylinder 1, a solenoid-operated proportional flow regulating valve 6 having an inlet port connected through a pipe 7 to the outlet port of the hydraulic pump 1, a solenoid-operated proportional unloading valve 8 connected to a pipe 9 branched from the pipe 8, an engine 10 for actuating the hydraulic pump 2, and an oil tank 11 for storing oil under pressure which is drawn and discharged by the hydraulic pump 2. The outlet port of the solenoid-operated proportional flow regulating valve 6 is connected to a pressure port of the directional control valve 3 through a pipe 13 having a check valve 12. The rotational speed of the engine 10 can be adjusted as desired by a speed regulator 10*a* (speed regulator means) connected thereto.

When the directional control valve 3 is in a neutral position A, it closes the bottom- and rod-side oil chambers 1*a*, 1*b* of the hydraulic cylinder 1 to hold the hydraulic cylinder 1 at rest. When the directional control valve 3 is shifted to a position B or a position C, it connects the bottom-side oil chamber 1*a* or the rod-side oil chamber 1*b* to the pipe 13. At this time, if the solenoid-operated proportional flow regulating valve 6 is open, then the hydraulic pump 2 operated by the engine 10 supplies oil under pressure from the oil tank 11 through the pipe 7, the solenoid-operated proportional flow regulating valve 6, the pipe 13, and the directional control valve 3 which is in the position B or the position C to the bottom-side oil chamber la or the rod-side oil chamber 1*b* of the hydraulic cylinder 1, thereby operating the hydraulic cylinder 1.

The control lever 5 of the control unit 4 is angularly movable back and forth in the directions indicated by the arrows Y. When the control lever 5 is angularly moved in one direction or the other, the control unit 4 applies a pilot pressure, which depends on the controlling movement of the control lever 5, through a pilot pipe 14 or a pilot pipe 15 to the directional control valve 3, thereby shifting the directional control valve 3 from the neutral position A to the position B or the position C. More specifically, when the control lever 5 is angularly moved forward, i.e., to the left in FIG. 1, the control unit 4 applies a pilot pressure which is proportional to the extent to which the control lever 5 is angularly moved forward through the pilot pipe 14 to the directional control valve 3, thus shifting the directional control valve 3 from the neutral position A to the position B. Conversely, when the control lever 5 is angularly moved backward, i.e., to the right in FIG. 1, the control unit 4 applies a pilot pressure which is proportional to the extent to which the control lever 5 is angularly moved backward through the pilot pipe 15 to the directional control valve 3, thus shifting the directional control valve 3 from the neutral position A to the position C.

The control unit 4 has a dead zone in the vicinity of the neutral position in which the control lever 5 is not turned forward or backward. When the control lever 5 is in the dead zone, the directional control valve 3 is maintained in the neutral position A.

Pressure sensors 16, 17 (controlling movement detecting means) detect pilot pressures Pa, Pb in the pilot pipes 14, 15, respectively, as the amount R of controlling movement of the control lever 5. A pressure sensor 18 (first pressure detecting means) detects a pressure $P_1$ in the pipe 13 connected to the outlet port of the solenoid-operated proportional flow regulating valve 6, i.e., a load pressure $P_1$ on the hydraulic cylinder 1. A pressure sensor 19 (second pressure detecting means) detects a pressure $P_2$ in the pipe 7 connected to the inlet port of the solenoid-operated proportional flow regulating valve 6, i.e., a discharge pressure $P_2$ from the hydraulic pump 2. The rotational speed of the engine 10 is detected by a rotational speed sensor 20 (speed detecting means). A controller 21 is supplied with detected signals from the pressure sensors 16, 17, 18, 19 and the rotational speed sensor 20, and outputs command signals to the solenoid-operated proportional flow regulating valve 6 and the solenoid-operated proportional unloading valve 8.

The controller 21 comprises a microcomputer or the like, and has functional blocks including a discharge pressure control unit 22 for controlling the solenoid-operated proportional unloading valve 8, a solenoid-operated valve control unit 23 (solenoid-operated valve control means) for controlling the solenoid-operated proportional flow regulating valve 6, and a flow rate setting unit 24 (flow rate setting means) for setting flow rate characteristics of oil supplied to the hydraulic cylinder 1 with respect the amount R of controlling movement of the control lever 5, i.e., flow rate characteristics of the solenoid-operated proportional flow regulating valve 6.

The discharge pressure control unit 22 and the solenoid-operated proportional unloading valve 8 jointly make up a discharge pressure control means 25. The discharge pressure control unit 22 indicates a pressure setting to the solenoid-operated proportional unloading valve 8 to enable the solenoid-operated proportional unloading valve 8 to control the discharge pressure $P_2$ from the hydraulic pump 2 so as to be equal to the pressure setting. Specifically, the discharge pressure control unit 22 indicates a pressure setting to the solenoid-operated proportional unloading valve 8 such that the difference ($P_2$–$P_1$) between the load pressure $P_1$ detected by the pressure sensor 18 and the discharge pressure $P_2$ detected by the pressure sensor 19 becomes a predetermined differential pressure, for thereby making constant the differential pressure ($P_2$–$P_1$) between the inlet and outlet ports of the solenoid-operated proportional flow regulating valve 6 irrespective of the load pressure $P_1$.

The flow rate setting unit 24 establishes flow rate characteristics of the solenoid-operated proportional flow regulating valve 6 with respect to the amount R of controlling movement of the control lever 5, depending on the load pressure $P_1$ detected by the pressure sensor 18 and the rotational speed N of the engine 10 detected by the rotational speed sensor 20, and supplies the established flow rate characteristics to the solenoid-operated valve control unit 23. The solenoid-operated valve control unit 23 then controls the solenoid-operated proportional flow regulating valve 6 according to the flow rate characteristics established by the flow rate setting unit 24, according to the present amount R of controlling movement of the control lever 5 which is detected by the pressure sensor 16 or 17.

Operation of the hydraulic device will be described below.

When the operator turns the control lever 5 while the hydraulic pump 2 is being operated by the engine 10, the directional control valve 3 moves from the neutral position A to the position B or the position C. The pressure sensor 18 detects the load pressure $P_1$ on the hydraulic cylinder 1, and the detected load pressure $P_1$ is read by the controller 21. The controller 21 also reads the pilot pressure Pa or Pb detected by the pressure sensor 16 or 17 as the amount R of controlling movement of the control lever 5, the discharge pressure $P_2$ from the hydraulic pump 2 detected by the pressure sensor 19, and the rotational speed N of the engine 10 detected by the rotational speed sensor 20.

At this time, the discharge pressure controller 22 of the controller 21 controls the solenoid-operated proportional unloading valve 8 such that the difference ($P_2$–$P_1$) between the load pressure $P_1$ and the discharge pressure $P_2$ becomes a predetermined differential pressure.

Figure 2:
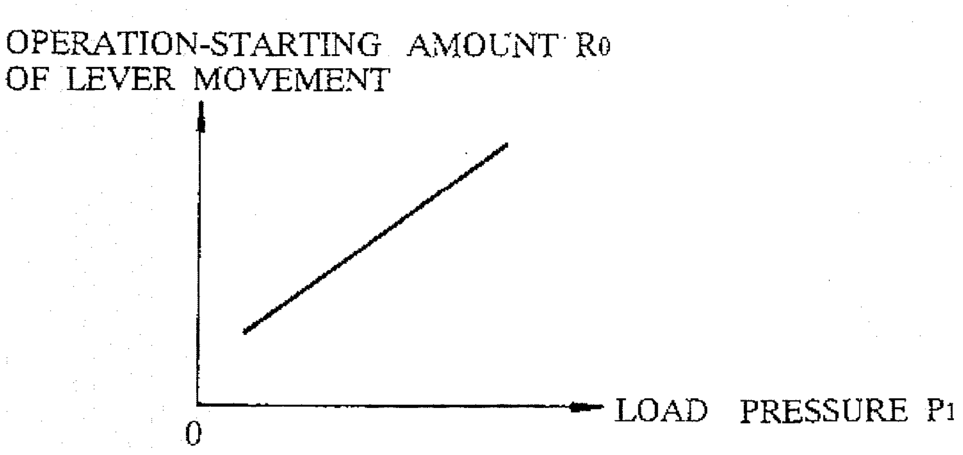
FIGS. 2 through 6 are diagrams illustrative of the manner in which the hydraulic device shown in FIG. 1 operates.

As shown in FIG. 2, the flow rate setting unit 24 of the controller 21 establishes an amount $R_0$ of controlling movement of the control lever 5 which starts supplying oil under pressure to the hydraulic cylinder 1, i.e., an amount $R_0$ of controlling movement of the control lever 5 which starts operating the hydraulic cylinder 1, depending on the detected load pressure $P_1$. The amount $R_0$ of controlling movement of the control lever 5 is established such that it becomes greater in proportion to the load pressure $P_1$.

Figure 3:
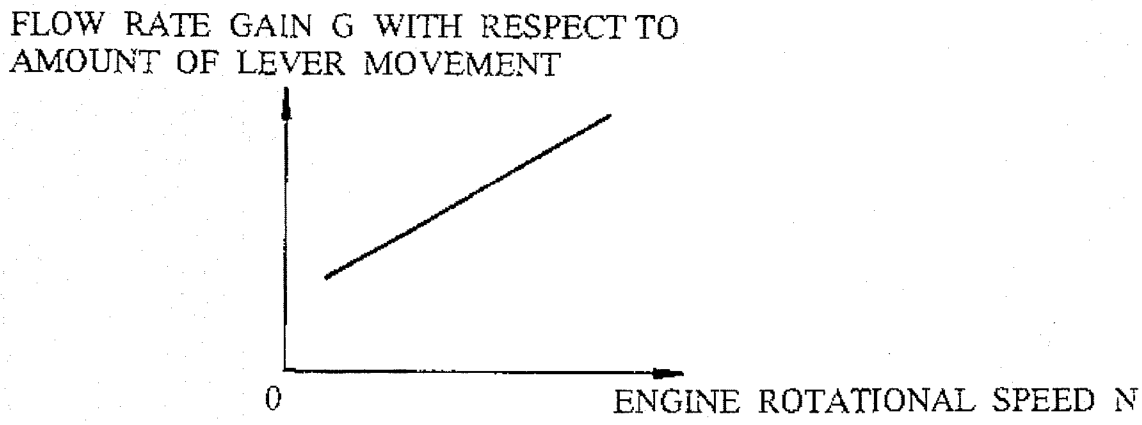

As shown in FIG. 3, the flow rate setting unit 24 also establishes a gain G of the flow rate of oil supplied under pressure to the hydraulic cylinder 1, i.e., a rate of change of the flow rate of oil, with respect to the amount R of controlling movement of the control lever 5, depending on the detected rotational speed N of the engine 10. The flow rate gain G is established such that it becomes greater in proportion to the rotational speed N.

Figure 4:
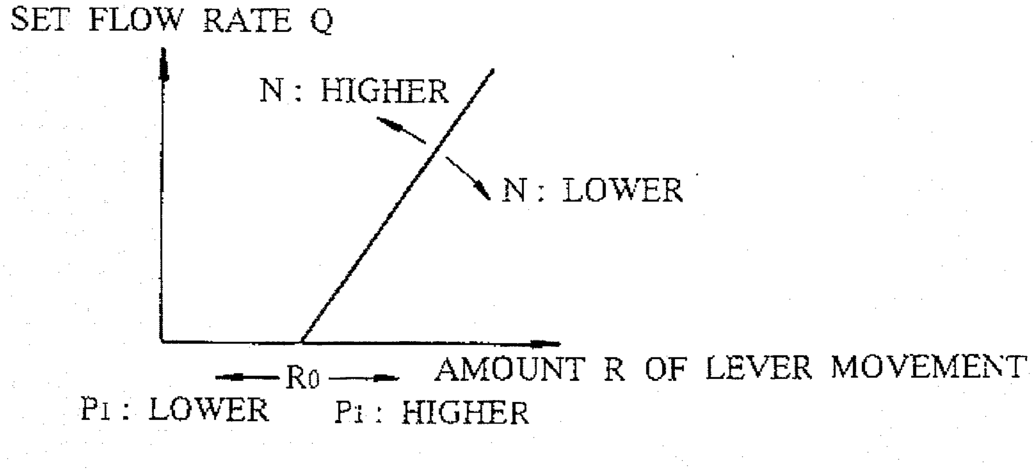

With the above settings of the amount $R_0$ of controlling movement of the control lever 5 and the flow rate gain G, flow rate characteristics of oil supplied under pressure from the hydraulic pump 2 to the hydraulic cylinder 1 with respect to the amount R of controlling movement of the control lever 5 are established as shown in FIG. 4. Specifically, the flow rate characteristics are such that from the time when the amount R of controlling movement of the control lever 5 has reached the amount $R_0$ established depending on the load pressure $P_1$, the hydraulic cylinder 1 starts being supplied with oil under pressure, and as the amount R increases from the amount $R_0$, a set flow rate Q increases at a gradient determined by the flow rate gain G established depending on the rotational speed N of the engine 10.

Depending on the detected amount R of controlling movement of the control lever 5, the solenoid-operated valve control unit 23 controls the solenoid-operated proportional flow regulating valve 6 according to the flow rate characteristics shown in FIG. 4.

Figure 5:
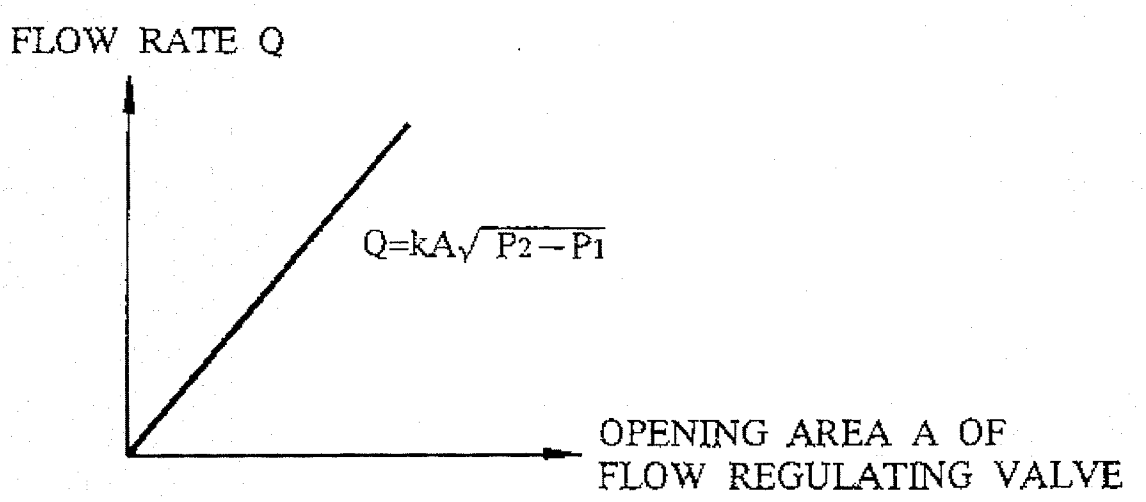

Specifically, the solenoid-operated valve control unit 23 supplies a command signal proportional to the set flow rate Q corresponding to the presently detected amount R of controlling movement of the control lever 5 to the solenoid-operated proportional flow regulating valve 6. Then, the solenoid-operated proportional flow regulating valve 6 opens with an opening area (opening) proportional to the command signal from the solenoid-operated valve control unit 23. Since the pressure difference ($P_2$–$P_1$) between the load pressure $P_1$ and the discharge pressure $P_2$, i.e., the differential pressure ($P_2$–$P_1$) between the inlet and outlet ports of the solenoid-operated proportional flow regulating valve 6, is controlled so as to be constant by the discharge pressure control unit 22 and the solenoid-operated proportional unloading valve 8, the flow rate Q through the solenoid-operated proportional flow regulating valve 6, i.e., the flow rate Q of oil supplied under pressure to the hydraulic cylinder 1, is proportional to the opening area A of the solenoid-operated proportional flow regulating valve 6, as shown in FIG. 5.

More specifically, the flow rate Q through the solenoid-operated proportional flow regulating valve 6, the opening area A thereof, and the differential pressure $(P_2-P_1)$ between the inlet and outlet ports thereof satisfy the following equation (1):

$$Q=kA(P_2-P_1)^{1/2} \quad (1)$$

where k is a proportionality constant determined depending on a flow rate coefficient, etc.

Since $(P_2 31\ P_1)$ in the equation (1) is constant, the flow rate Q is proportional to the opening area A.

Figure 6:
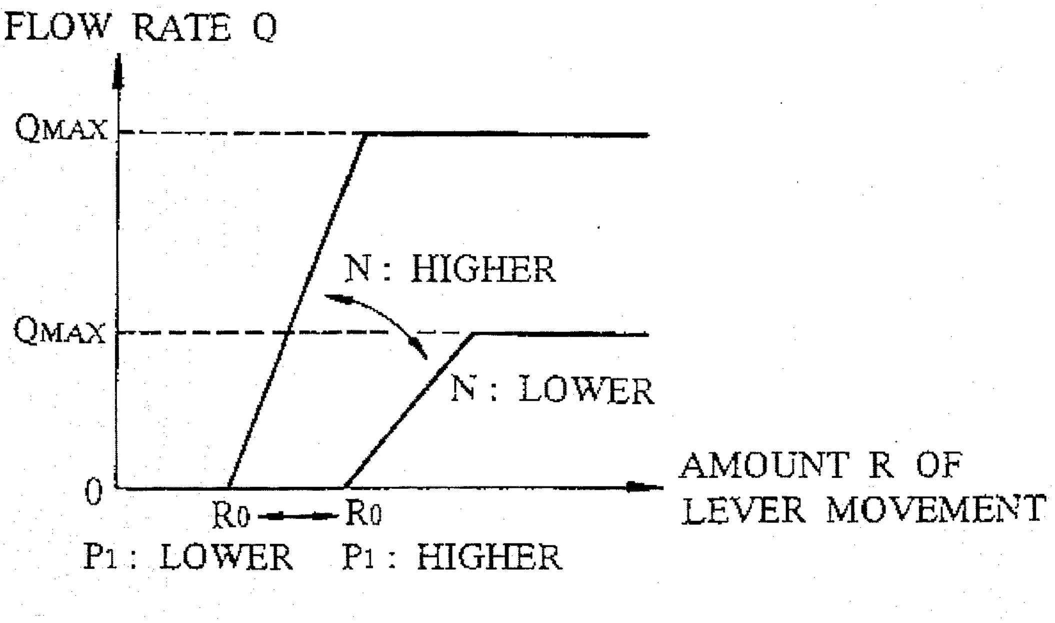

Therefore, by controlling the opening area A of the solenoid-operated proportional flow regulating valve 6, the flow rate Q through the solenoid-operated proportional flow regulating valve 6 can be equalized to the flow rate Q set by the solenoid-operated valve control unit 23, and the flow rate Q of oil supplied under pressure to the hydraulic cylinder 1 has characteristics with respect to the amount R of controlling movement of the control lever 5 as shown in FIG. 6. In FIG. 6, the flow rate Q starts to increase at the amount $R_0$ of controlling movement of the control lever 5 which is established depending on the load pressure $P_1$, and thereafter increases as the amount R of controlling movement of the control lever 5 increases with the flow rate gain G (gradient) which is established depending on the rotational speed N of the engine 10. The flow rate Q increases until it reaches a maximum discharge flow rate $Q_{MAX}$ of the hydraulic pump 2 which depends on the rotational speed N of the engine 10. After the flow rate Q has reached the maximum discharge flow rate $Q_{MAX}$, the flow rate Q remains unchanged even if the amount R of controlling movement of the control lever 5 increases.

The amount $R_0$ of controlling movement of the control lever 5 at which the flow rate Q starts to increase, i.e., the hydraulic cylinder 1 starts to operate, is established such that it increases in proportion to the load pressure $P_1$. Therefore, the operator of the hydraulic device can quickly and easily recognize the magnitude of the load on the hydraulic cylinder 1 through the amount of controlling movement of the control lever 5 at which the hydraulic cylinder 1 starts to operate.

The flow rate gain G with respect to the amount R of controlling movement of the control lever 5 is established such that it increases in proportion to the rotational speed N of the engine 10. Consequently, the operator can obtain desired flow rate characteristics by adjusting the rotational speed N of the engine 10 with the speed regulator **10*a* depending on the operator's preference and working pattern. Specifically, when the hydraulic cylinder 1 is required to operate at a higher speed with respect to the amount R of controlling movement of the control lever 5, the operator may operate the speed regulator 10*a* to increase the rotational speed N of the engine 10 for thereby increasing the flow rate gain G. Conversely, when the hydraulic cylinder 1 is required to operate at a lower speed with respect to the amount R of controlling movement of the control lever 5, the operator may operate the speed regulator 10*a* to reduce the rotational speed N of the engine 10** for thereby decreasing the flow rate gain G.

With the hydraulic device according to the present invention, therefore, the operator can quickly and easily recognize the load condition of the hydraulic cylinder 1 through the controlling movement of the control lever 5, and can also obtain desired operating characteristics of the hydraulic cylinder 1 with respect to the amount R of controlling movement of the control lever 5 by selecting the rotational speed N of the engine 10.

While the hydraulic cylinder 1 has been described as an actuator in the illustrated embodiment, the principles of the present invention are also applicable to any of various other actuators such as a hydraulic motor or the like.

In the illustrated embodiment, only the amount $R_0$ of controlling movement of the control lever 5 at which the hydraulic cylinder 1 starts to operate is established depending on the load pressure $P_1$. However, it is possible to establish the flow rate gain G depending on the load pressure $P_1$.

The hydraulic device according to the present invention is useful as a hydraulic device in a working machine whose actuator such as a hydraulic cylinder, a hydraulic motor, or the like can be operated by a control lever. Particularly, the hydraulic device according to the present invention is suitable for use in a working machine, such as a hydraulic shovel or the like, which is capable of carrying out building, construction, and civil engineering work.

Although a certain preferred embodiment of the present invention has been shown and described in detail, it should be understood that various changes and modifications may be made therein without departing from the scope of the appended claims.

What is claimed is:

1. A hydraulic device for use in a working machine, comprising:

a hydraulic pump operable by an engine whose rotational speed is adjustable by a speed regulator;

an actuator operable by oil supplied under pressure from said hydraulic pump;

a directional control valve connected to a pipe between said actuator and said hydraulic pump for changing a direction in which said actuator operates;

a control lever for shifting said directional control valve;

a solenoid-operated proportional flow regulating valve connected to said pipe for controlling a flow rate of the oil supplied under pressure from said hydraulic pump to said actuator;

first pressure detecting means for detecting a load pressure on said actuator on an outlet side of said solenoid-operated proportional flow regulating valve;

second pressure detecting means for detecting a pressure on an inlet side of said solenoid-operated proportional flow regulating valve;

discharge pressure control means for controlling a discharge pressure of said hydraulic pump to equalize the difference between the pressures detected by said first and second pressure detecting means to a preset differential pressure;

controlling movement detecting means for detecting an amount of controlling movement of said control lever;

speed detecting means for detecting the rotational speed of said engine;

flow rate setting means for establishing flow rate characteristics of the oil supplied under pressure to said actuator with respect to the amount of controlling movement of said control lever, depending on the load pressure on said actuator detected by said first pressure detecting means and the rotational speed of said engine detected by said speed detecting means; and solenoid-operated valve control means for adjusting an opening of said solenoid-operated proportional flow regulating valve to achieve the flow rate characteristics established by said flow rate setting means depending on the amount of controlling movement of said control lever detected by said controlling movement detecting means.

2. A hydraulic device according to claim 1, wherein said flow rate setting means comprises means for establishing flow rate characteristics such that a gain of flow rate of the oil supplied under pressure to said actuator with respect to the amount of controlling movement of said control lever increases as the rotational speed of said engine detected by said speed detecting means increases.

3. A hydraulic device according to claim 1 or 2, wherein said flow rate setting means comprises means for establishing flow rate characteristics such that an amount of controlling movement of said control lever at which the oil under pressure starts flowing into said actuator increases as the load pressure on said actuator detected by said first pressure detecting means increases.

4. A hydraulic device according to claim 1 or 2, wherein said discharge pressure control means comprises a solenoid-operated proportional unloading valve connected to a pipe branched from a pipe extending from said hydraulic pump to said solenoid-operated proportional flow regulating valve, and means for controlling the discharge pressure from said hydraulic pump by controlling a pressure setting for said solenoid-operated proportional unloading valve to equalize the difference between the pressures detected by said first and second pressure detecting means to said preset differential pressure.

* * * * *